United States Patent
Tello et al.

(10) Patent No.: US 10,174,604 B2
(45) Date of Patent: Jan. 8, 2019

(54) ULTRASONIC CEMENT AND CASING THICKNESS EVALUATION

(71) Applicant: Weatherford Technology Holdings, LLC, Houston, TX (US)

(72) Inventors: Lucio N. Tello, Benbrook, TX (US); Edwin K. Roberts, Benbrook, TX (US); Thomas J. Blankinship, Fort Worth, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 144 days.

(21) Appl. No.: 15/163,105

(22) Filed: May 24, 2016

(65) Prior Publication Data
US 2017/0342817 A1    Nov. 30, 2017

(51) Int. Cl.
*G01V 1/50* (2006.01)
*E21B 47/00* (2012.01)
*E21B 17/10* (2006.01)
*E21B 33/14* (2006.01)

(52) U.S. Cl.
CPC ...... *E21B 47/0005* (2013.01); *E21B 17/1078* (2013.01); *G01V 1/50* (2013.01); *E21B 33/14* (2013.01); *G01V 2210/542* (2013.01)

(58) Field of Classification Search
CPC . G01V 1/50; G01V 2210/542; E21B 47/0005
USPC .......................................... 367/35; 181/105
See application file for complete search history.

(56) References Cited

U.S. PATENT DOCUMENTS

| 4,255,798 | A | * | 3/1981 | Havira | E21B 47/0005 181/105 |
| 4,382,290 | A | * | 5/1983 | Havira | E21B 47/0005 181/104 |
| 4,685,092 | A | | 8/1987 | Dumont | |
| 4,709,357 | A | | 11/1987 | Maki, Jr. | |
| 4,802,145 | A | | 1/1989 | Mount, II | |
| 4,912,683 | A | * | 3/1990 | Katahara | E21B 47/082 181/105 |

(Continued)

FOREIGN PATENT DOCUMENTS

| WO | 2016187239 A1 | 11/2016 |
| WO | 2016187240 A1 | 11/2016 |

OTHER PUBLICATIONS

"Cement Bond Logging Tools," Schlumberger, http://www.slb.com/~/media/Files/production/product_sheets/well_integrity/cement_bond_logging_tools.pdf, Mar. 2007, 4 pages.

(Continued)

*Primary Examiner* — Ian J Lobo
(74) *Attorney, Agent, or Firm* — Lewis & Reese, PLLC

(57) ABSTRACT

Methods and systems for logging a wellbore having a casing are described. Acoustic energy, typically ultrasonic acoustic energy, is used to stimulate reverberation of the casing at a harmonic (for example, the second or third harmonic) of the resonance frequency of the casing. One or more acoustic sensors are used to measure acoustic signals generated by the casing reverberation. Parameters of the casing are calculated based on the measured acoustic signals adjusted by an adjustment factor determined by the particular harmonic. The use of harmonics instead of the fundamental resonance frequency allows wellbores with casings having walls thicker than 0.625 inches to be logged.

9 Claims, 6 Drawing Sheets

(56) References Cited

U.S. PATENT DOCUMENTS

| | | | |
|---|---|---|---|
| 4,916,648 A | | 4/1990 | Gard |
| 4,928,269 A | * | 5/1990 | Kimball ................ G01V 1/306 181/105 |
| 5,031,163 A | * | 7/1991 | Holzhausen ............. G01V 1/50 181/105 |
| 5,206,836 A | * | 4/1993 | Holzhausen ............. G01V 1/50 181/105 |
| 5,216,638 A | | 6/1993 | Wright |
| 5,218,573 A | * | 6/1993 | Katahara ................ E21B 47/08 367/32 |
| 5,874,676 A | | 2/1999 | Maki, Jr. |
| 7,149,146 B2 | | 12/2006 | Kuijk et al. |
| 7,522,471 B2 | | 4/2009 | Froelich et al. |
| 7,525,872 B2 | | 4/2009 | Tang et al. |
| 7,656,747 B2 | | 2/2010 | Mandal et al. |
| 7,681,450 B2 | | 3/2010 | Bolshakov et al. |
| 7,755,972 B2 | | 7/2010 | Yogeswaren et al. |
| 7,755,973 B2 | | 7/2010 | Tello |
| 7,885,142 B2 | | 2/2011 | Tello et al. |
| 8,157,008 B2 | | 4/2012 | Lilley |
| 8,270,248 B2 | | 9/2012 | Hurst et al. |
| 8,576,660 B2 | | 11/2013 | Mandal et al. |
| 8,767,506 B2 | | 7/2014 | Froelich et al. |
| 8,824,240 B2 | | 9/2014 | Roberts et al. |
| 9,494,705 B2 | | 11/2016 | Sinha et al. |
| 9,523,273 B2 | | 12/2016 | Mandal |
| 9,534,487 B2 | | 1/2017 | Zeroug et al. |
| 9,594,177 B2 | | 3/2017 | Froelich et al. |
| 9,732,607 B2 | | 8/2017 | Zeroug et al. |
| 9,784,875 B2 | | 10/2017 | Zeroug et al. |
| 9,822,627 B2 | | 11/2017 | Froelich |
| 2006/0067162 A1 | | 3/2006 | Blankinship et al. |
| 2010/0169043 A1 | * | 7/2010 | Watts .................... G01B 17/02 702/171 |
| 2013/0155812 A1 | * | 6/2013 | Froelich ............. E21B 47/0005 367/35 |
| 2014/0052376 A1 | | 2/2014 | Guo et al. |
| 2015/0003203 A1 | * | 1/2015 | Froelich ............. E21B 47/0005 367/86 |
| 2015/0085611 A1 | * | 3/2015 | Mandal ............... E21B 47/0005 367/82 |
| 2015/0198030 A1 | | 7/2015 | Tello et al. |
| 2015/0198032 A1 | | 7/2015 | Sinha et al. |
| 2015/0219780 A1 | | 8/2015 | Zeroug et al. |

OTHER PUBLICATIONS

"Wireline Ultrasonic, Caliper, and Cement Bond Logs Provide Critical Casing Integrity Data for 30 wells," Weatherford International, www.weatherford.com/doc/wft247168, created: Sep. 29, 2015, 2 pages.

Yakimov, M., Powerpoint Presentation entitled "The Dark Art of Cement Bond Log," Weatherford, SPE International—Queensland Section, http://petronode.com/pdf/M%20Yakimov_The%20Dark%20Art%20of%20Cement%20Bond%20Log.pdf, Sep. 28, 2012, 56 pages.

* cited by examiner

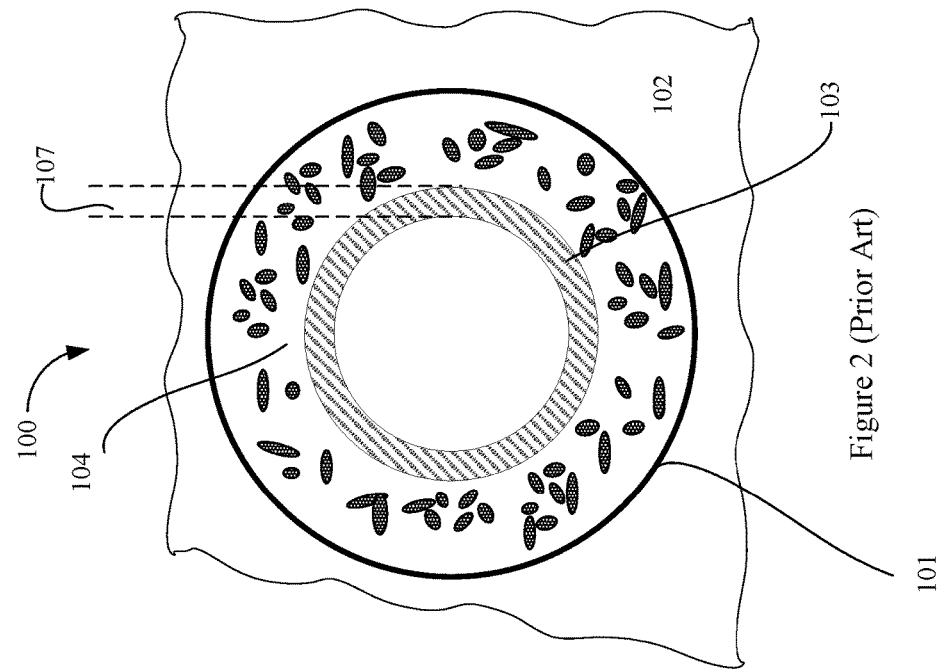
Figure 2 (Prior Art)
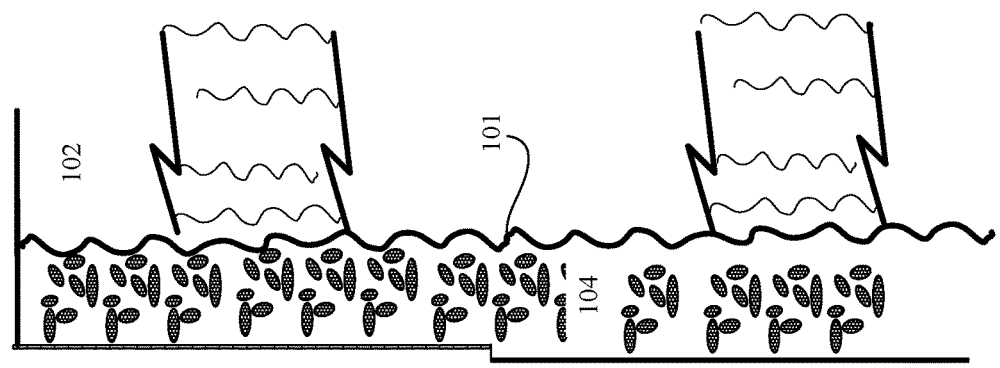
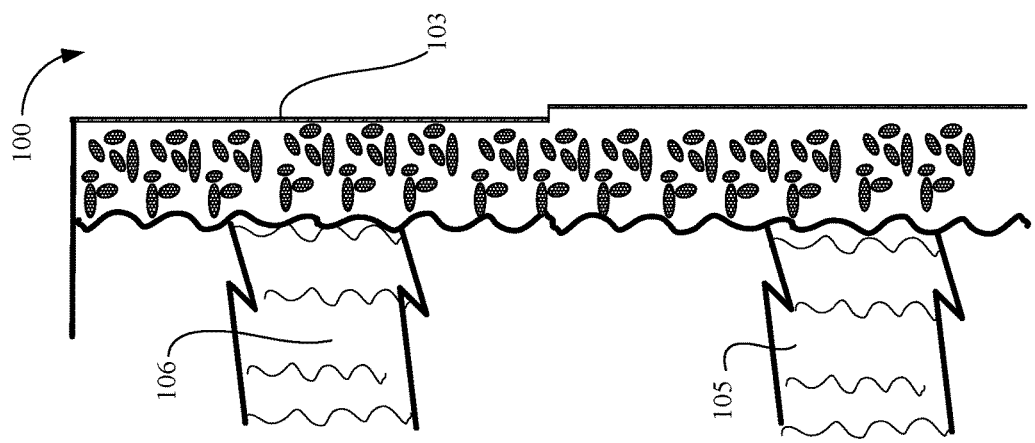
Figure 1 (Prior Art)

ULTRASONIC CEMENT AND CASING THICKNESS EVALUATION

FIELD OF THE INVENTION

The present application relates to wellbore logging, and more particularly to logging wellbores containing a cemented casing.

BACKGROUND

FIGS. 1 and 2 illustrate a wellbore 100 extending into the earth 102. For example, the wellbore may be a natural gas well or an oil well. FIG. 1 is a cross section view and FIG. 2 is a view from the top, as if you were standing at the edge of the wellbore looking into it. Drilling the wellbore 100 creates a face 101, which is a boundary between the wellbore and the earth 102. The wellbore also includes a casing 103, which is typically a metal tubular structure. The ring-shaped space between the face 101 and the casing 103, is referred to as an annulus and is denoted as numeral 104. The relative sizes of the annulus and the casing are not to scale in the figures. It is important to note that, the wellbore 100 may include horizontal sections even though the wellbore is illustrated as only a vertical section. Distance along the wellbore from the surface is referred to herein as depth, even in horizontal sections.

It is common practice in the art to cement the casing 103 into the wellbore 100 by filling the annulus 104 with cement. This serves several purposes. It provides stability to the casing. It also prevents fluid communication between formations or reservoirs at different depths within the wellbore. For example, assume that formation 105 is a hydrocarbon-producing formation, like the Barnett Shale formation in Texas, which produces natural gas. Further assume that formation 106 is an aquifer (i.e., a formation containing water). If the annulus 104 were left empty, then it would provide fluid communication between formations 105 and 106. Water from the aquifer 106 would damage the valuable gas-producing formation 105 and gas from formation 105 would contaminate the aquifer 106.

If the cement in the annulus 104 is to serve its purpose of preventing cross-contamination between various formations and reservoirs, it is important that the cement be free of any paths, such as spaces, cracks or fissures that could provide fluid communication between such formations. For example, if the cement does not bond well to the casing 103, then a space might be left between the casing and the cement that can provide a path for fluid communication between formations.

Casing integrity can also fail if the casing becomes too thin, for example, due to wear and/or corrosion. Conversely, scale or other buildup can cause the casing to thicken. It is therefore common practice to measure several parameters concerning the condition of a wellbore casing and cement. For example, it is common practice to evaluate the quality and strength of the cement and the quality of its bond with the casing. This practice is referred to as cement bond logging (CBL). Likewise, it is common to measure the thickness of the casing of a wellbore and the internal diameter of the casing, to detect thinning and to detect places where the wellbore may become constricted.

Referring to FIG. 2, the tubulars used for the casing 103 have a particular wall thickness 107. Well servicing operators may choose tubulars having different wall thicknesses for various different situations. For reasons described below, measuring parameters of cased wellbores becomes difficult when thick casings are used. The ability to acquire accurate measurements in wells having thick casing walls is important, and thus new measurement methods are needed.

BRIEF DESCRIPTION OF THE DRAWINGS

FIG. 1 shows a wellbore having a cemented casing.
FIG. 2 shows a wellbore having a cemented casing.

DESCRIPTION

Figure 3:
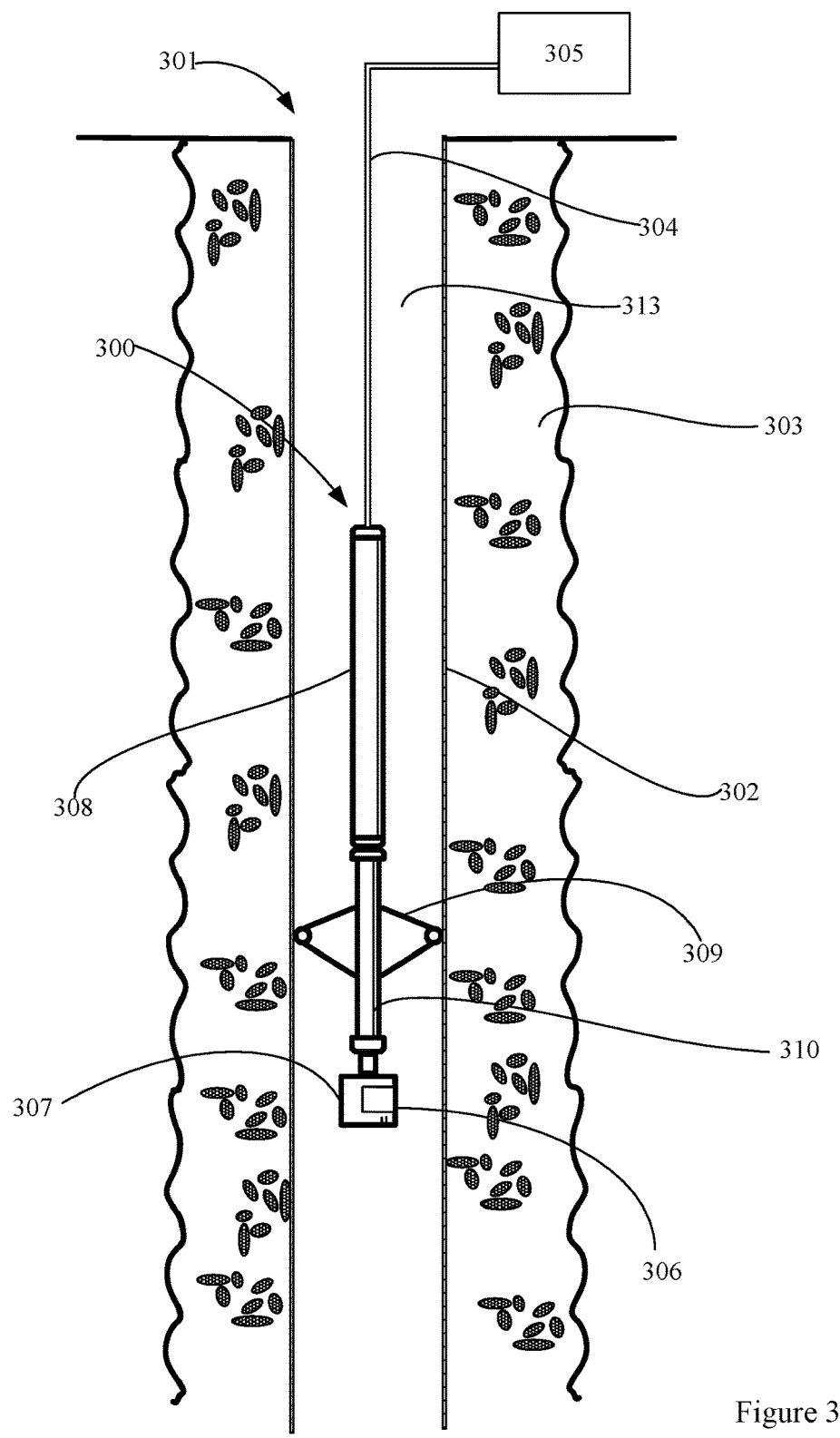
FIG. 3 shows a ultrasonic wellbore tool (UWT) for logging a wellbore having a cemented casing.

FIG. 3 shows a tool 300 for measuring parameters of a cased wellbore. The tool 300 uses ultrasonic energy, as described below. Such tools are therefore referred to herein as ultrasonic wellbore tools (UWTs). The UWT 300 is deployed in a wellbore 301 having a casing 302 and a cemented annulus 303, as described earlier. The UWT 300 is run into the wellbore 301 using a line 304. The line 304 supports the UWT and may also include wires for providing electrical power to the UWT and for providing data communication between the UWT and instruments 305 (such as computers, monitors, etc.) at the surface of the wellbore. A line that provides electrical and/or data communication is known as a "wireline." Alternatively, the UWT 300 may include its own power source and may store all of the programming it needs for operation and all of the measurement data it collects in memory within the UWT itself. If the UWT is self-contained, then line 304 is simply for positioning the UWT within the wellbore.

The UWT 300 includes at least one sonic or ultrasonic transducer 306. According to one such embodiment, an acoustic transducer is configured within a scanning head 307, that can be rotated about the axis of the UWT. The scanning head can include a single transducer or multiple transducer that transmit an acoustic signal toward the inside wall of the casing and that receive the return signals. The scanning head can rotate so that the entire circumference of the casing is scanned before the UWT moves to a different depth within the wellbore. A UWT including an acoustic transducer in a scanning head is described in U.S. Patent Application Publication No. 2006/0067162, published Mar. 30, 2006, the entire contents of which are incorporated herein by reference.

A UWT 300, as illustrated in FIG. 3, generally includes a tool body 308, which may contain electronics for controlling the operation of the UWT and for either storing data that the UWT collects or telemetering that data back to instrumentation at the surface of the wellbore. Such electronics may include one or more processors programmed, or configured to be programmed with instructions for operating the UWT, for performing the calculations described below, and/or for packaging and telemetering data to the surface in an appropriate format. As used herein, the term "processing" broadly refers to analyzing or deriving information from data generated from the ultrasonic transducer(s), to simply transmitting transducer data out of the wellbore for analysis, and/or to recording the transducer data within the tool for later analysis. Examples of suitable processors include Pentium® i5 and i7 processors, or the like. Additionally, or alternatively, the UWT 300 may be controlled from the surface via wireline, as described above. Thus, one or more processors may be contained within the UWT 300 or may be provided from outside the tool, by wireline, for example.

According to some embodiments, the UWT can be centered within the wellbore using one or more centralizers 309, as is known in the art. The centralizer 309 may be integral to the UWT 300 or may be deployed as a separate modular component attached to the UWT 300, such as a centralizer sub 310.

The acoustic transducer 306 can be any type of sonic or ultrasonic transmitter known in the art, but is typically a piezoelectric (PZT) transducer. The acoustic transducer 306 can be configured to generate ultrasonic signals having a frequency within a usable range, as described in more detail below, and to receive such signals. In other words, the acoustic transducer 306 can be a transceiver, meaning that it both transmits and receives acoustic signals. Other embodiments of ultrasonic tools may be configured with separate transducers for transmitting (i.e., transmitters) and for receiving (i.e., receivers) acoustic signals. Acoustic transducers, like 306, are generally described in the in U.S. Patent Application Publication No. 2006/0067162, referenced above.

The general principles of acoustic logging are well known in the art and will not be explained in detail here. The events that occur during an acoustic measurement are briefly described here, with reference to FIG. 3 and FIG. 4, which illustrates acoustic signals received at acoustic transducer 306. During an acoustic measurement, the acoustic transducer 306 generates an acoustic signal in the form of a compressional wave. The acoustic signal should preferably have a frequency that will stimulate resonance vibration of the casing. For typical casing thicknesses of about 0.65 inches, that frequency is in the range of about 250 KHz.

The acoustic signal travels from the acoustic transducer 306, bounces off the inner diameter of the casing 302, and is received at the acoustic transducer causes the casing to reverberate. The time period 401 is the time between when the transducer generates the acoustic signal when it receives the first bounce-back signal. In other words, it is the travel time from the transducer to the inside wall of the casing and back to the receiver. The casing inside diameter of the casing can be calculated based on time period 401.

The frequency of the received signal during the time 402 is determined by the casing thickness. Accordingly, measuring the reverberation resonance frequency provides a measurement the actual casing thickness. The actual casing thickness may be different than the nominal casing thickness (i.e., the original thickness of the casing installed in the wellbore), for the reasons described above.

The casing reverberation attenuates (i.e., the amplitude of the reverberation decreases with time) very quickly if the casing is well cemented but not as quickly if the casing is free or only partially bonded to the cement. Measurements of the amplitude (specifically, the attenuation of the amplitude, known as "ring down") of the reverberation in area 403 of the waveform 400 is used to determine the quality of the bond between the casing and cement. The attenuation is also used to determine the compressive strength of the cement.

The attenuation can be determined based on the peak amplitudes within region 403. Alternatively, the attenuation can be determined based on the integrated areas 404 under each of the peaks. The time window 405 is typically on the order of about 100 µs. The time window 403 during which attenuation is measured, is typically about 10 to about 30 µs. Typically, time window 403 is calculated to measure about four or five casing reverberations for determining attenuation.

Casings with thicker walls vibrate at lower frequencies. Since the frequency at which a casing resonates is a function of its thickness, it is useful to select acoustic transducers that are 'tuned' for particular casing thicknesses. Ideally the transducer generates an acoustic signal is closely matched to the casing resonance frequency in order to excite the casing reverberation. The casing will reverberate strongest when the transmitted signal exactly matches the resonance frequency. A transmitted signal that is close, but not identical to, the casing resonance frequency will still excite the casing to reverberate, but not as intensely. Regardless of the transmitted signal frequency, the acoustic response caused by the casing reverberation will correspond to the resonance frequency.

The resonant frequency of a PZT transducers inversely proportional to the thickness of the PZT material. In other words, to transmit/receive a relatively lower frequency signal, an operator would select acoustic sensors having a thicker PZT material than those used for measuring relatively higher frequencies. That is, thicker casings generally call for thicker PZT materials compared to thinner casings. An operator may use different acoustic sensors depending on the thickness of the casing in the particular wellbore to be logged. Each sensor is useful over a range of frequencies. If the casing is thin, the operator may select a high frequency sensor; if the casing is medium thickness, the operator may use a medium frequency sensor; and the operator may use a low frequency sensor for a thick casing. Many acoustic wellbore measuring tools have a standard set of sensors from which to choose.

But there is a lower limit to the frequencies that can be accurately measured with PZT sensors, and, consequently, an upper limit to the casing thicknesses that can be accurately measured. PZT sensors of adequate thickness to measure the low frequencies generated by casings greater than about 0.65 inches in thickness are difficult manufacture and, once manufactured, can be difficult to implement within an UWT.

Figure 4:
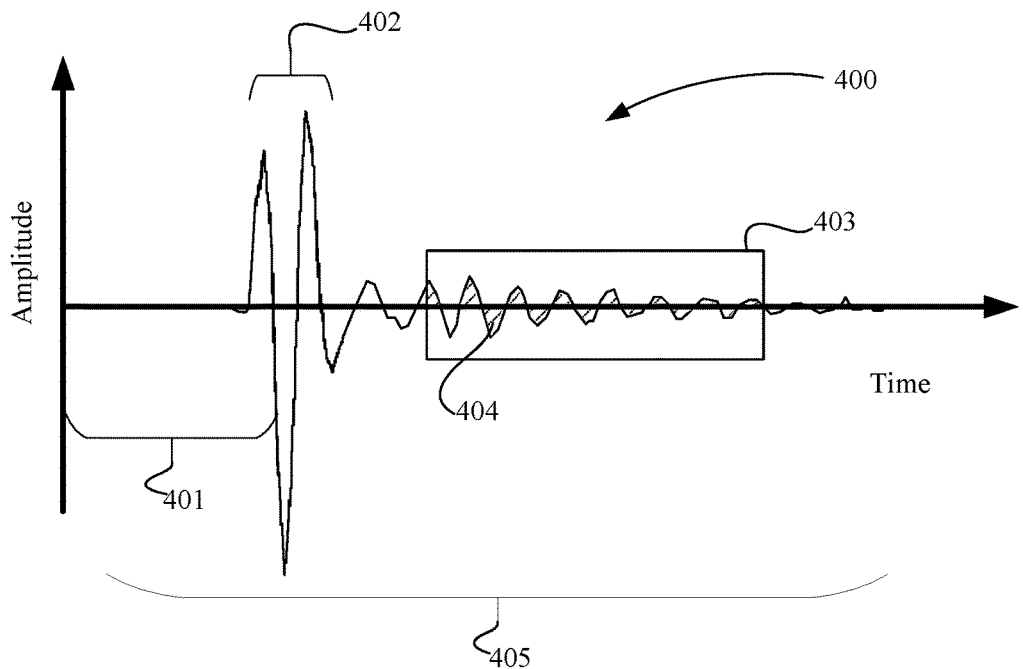
FIG. 4 shows an acoustic waveform generated by the UWT illustrated in FIG. 3.
Figure 5:
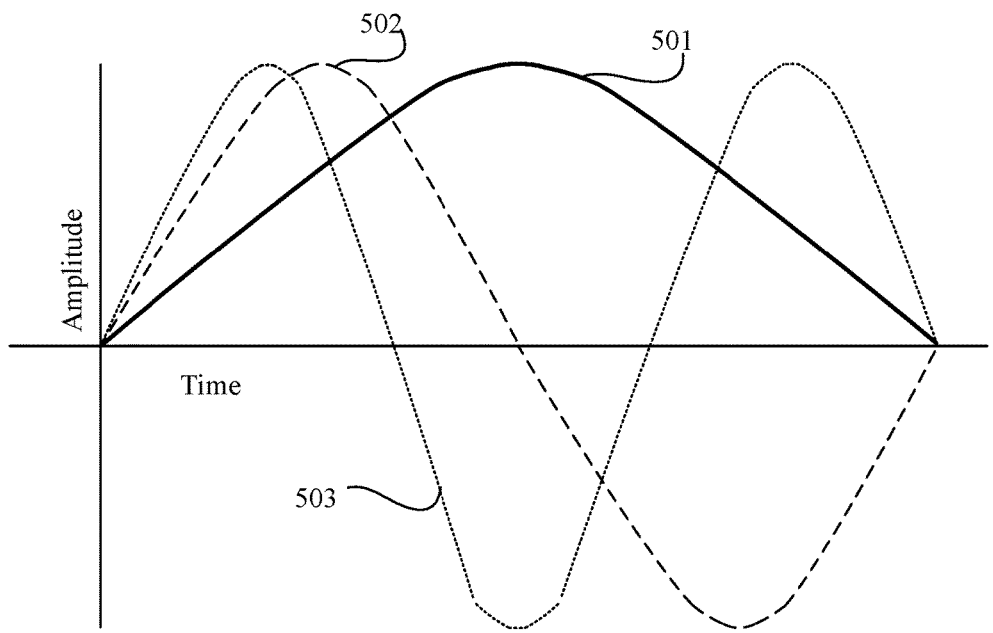
FIG. 5 shows a fundamental resonance frequency of a wellbore casing and second and third harmonics of the fundamental resonance frequency.

The UWTs disclosed herein, such as UWT 300, overcome the difficulties associated with thick wellbore casings by implementing PZT sensors selected from a standard set of acoustic transmitter/receivers (i.e., standard frequency, low frequency, and high frequency), but using the sensors to measure harmonics of the resonant frequency of the casing instead of measuring the fundamental resonant frequency, as is typically done. FIG. 5 illustrates waveforms corresponding to three vibrational modes of an oscillator (such as an oscillating string or a reverberating wellbore casing). The fundamental mode is represented as curve 501, the second mode by curve 502, and the third mode by curve 503. A person of skill in the art would recognize that the waveform 400 illustrated in FIG. 4 is a generally a combination of frequencies associated with each of the modes, as well as higher modes (not illustrated). In other words, the waveform is a combination of the fundamental frequency (the frequency associated the fundamental mode 500), the second harmonic (the frequency associated with the second mode 502), the third harmonic (the frequency associated with the third mode 503), and so on.

Typically, an UWT measurement is based on the fundamental resonance frequency of a casing. But in a situation wherein the fundamental resonance frequency is too low to be accurately measured, the UWTs described herein can be configured to instead measure frequencies associated with higher modes, such as 502 or 503. Since the harmonic frequencies are higher than the fundamental frequency, one or more of the harmonic frequencies may be within a usable range. For example, an operator needing to log a wellbore having a thick casing may select the standard sensor used for high frequency signals (i.e., the sensor typically used for very thin casings), but instead of measuring the fundamental resonance frequency, as would usually be done, use the high frequency sensor to measure a harmonic of the resonance frequency.

Figure 6:
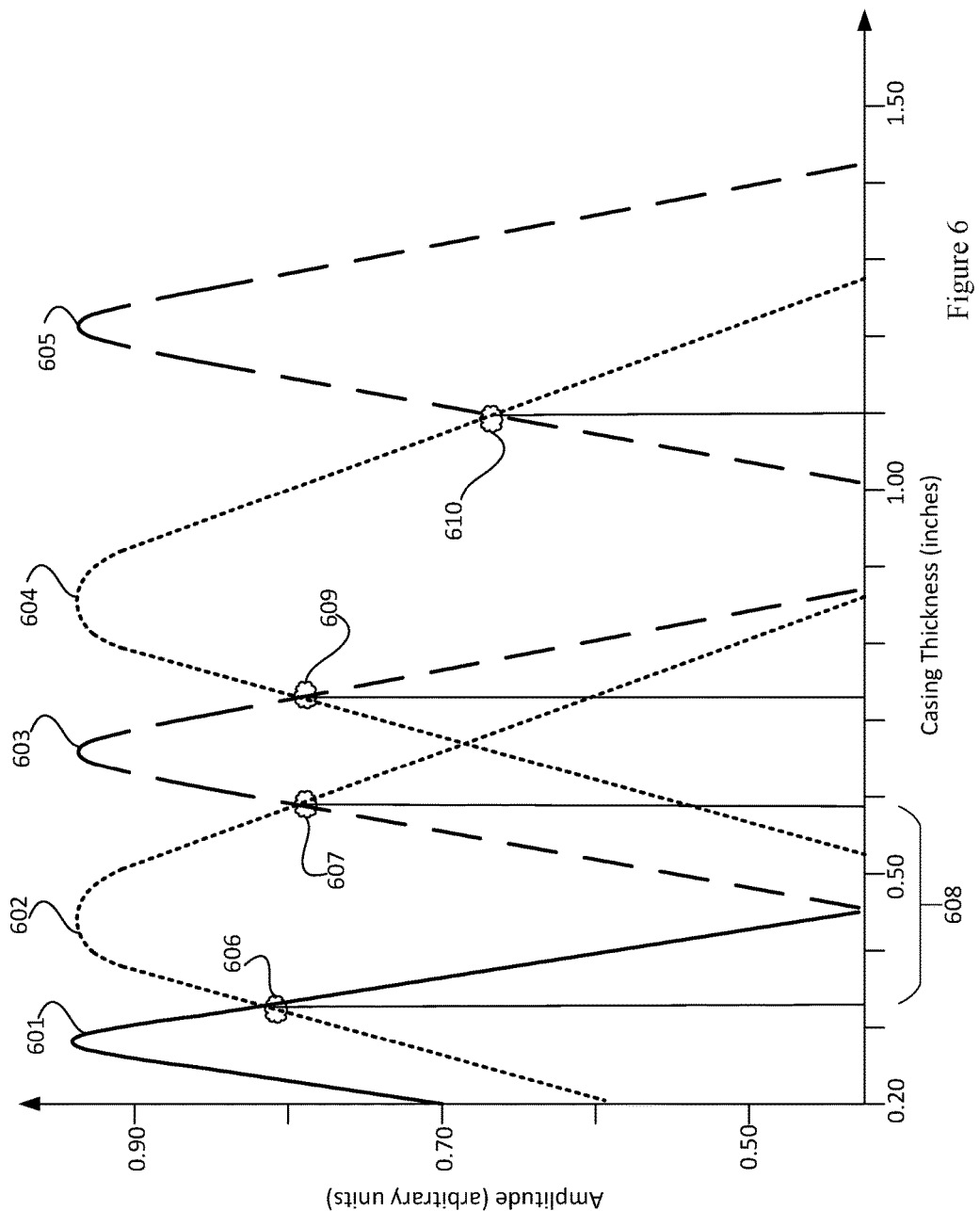
FIG. 6 is a graph of amplitude as a function of casing thickness for fundamental resonance frequency, second, and third harmonics.

FIG. 6 illustrates sensor responses for a high frequency transducer (solid line), medium frequency transducer (dotted line), and a low frequency transducer (dashed line) in casings having different wall thicknesses. The horizontal axis represents casing wall thickness (in inches) and the vertical axis represents the transducer response amplitude (in arbitrary units). Referring to curve 601, a high frequency transducer has a maximum amplitude corresponding to a casing with a wall thick of about 0.27 inches. So an operator would typically choose a high frequency transducer to perform acoustic measurements in a wellbore cased with casing having nominally a 0.25 inch thick wall, for example. However, if the wall thickness were nominally 0.45 inches, then the operator would not use a high frequency transducer, but would instead use a medium frequency transducer. Curve 602 shows that the medium frequency transducer has a maximum response corresponding to a wall thickness of about 0.44 inches. Likewise, a low frequency transducer has a maximum response corresponding to a wall thickness of about 0.70 inches.

Points 606 and 607 are where the medium frequency response overlaps with the high frequency and low frequency responses, respectively. Bracket 608 represents the range of casing thickness values between those two points, namely, the range between about 0.33 inches and about 0.59 inches in casing thickness. So if an operator were logging a wellbore cased with a casing having a nominal wall thickness between about 0.33 inches and about 0.59 inches, the operator would likely use a medium frequency transducer.

Point 609 illustrates where the response 603 of the low frequency transducer overlaps with the response 604 of the medium frequency transducer measuring the second harmonic of a casing resonance frequency. According to FIG. 6, if an operator needed to log a wellbore cased with a casing having a nominal wall thickness between about 0.73 inches and about 1.10 inches, the operator would use a medium frequency transducer, but would instead measure the second harmonic resonance frequency of the casing reverberation. Likewise, to measure casings with wall thicknesses greater than about 1.35 inches, an operator could us a low frequency transducer to measure second harmonic frequencies of the casing, according to FIG. 6.

It should be noted that the transducer frequency response v. casing wall thickness relationship illustrated in FIG. 6 is illustrative. Such a relationship must be empirically determined and calibrated for a given set of transducers.

Figure 7:
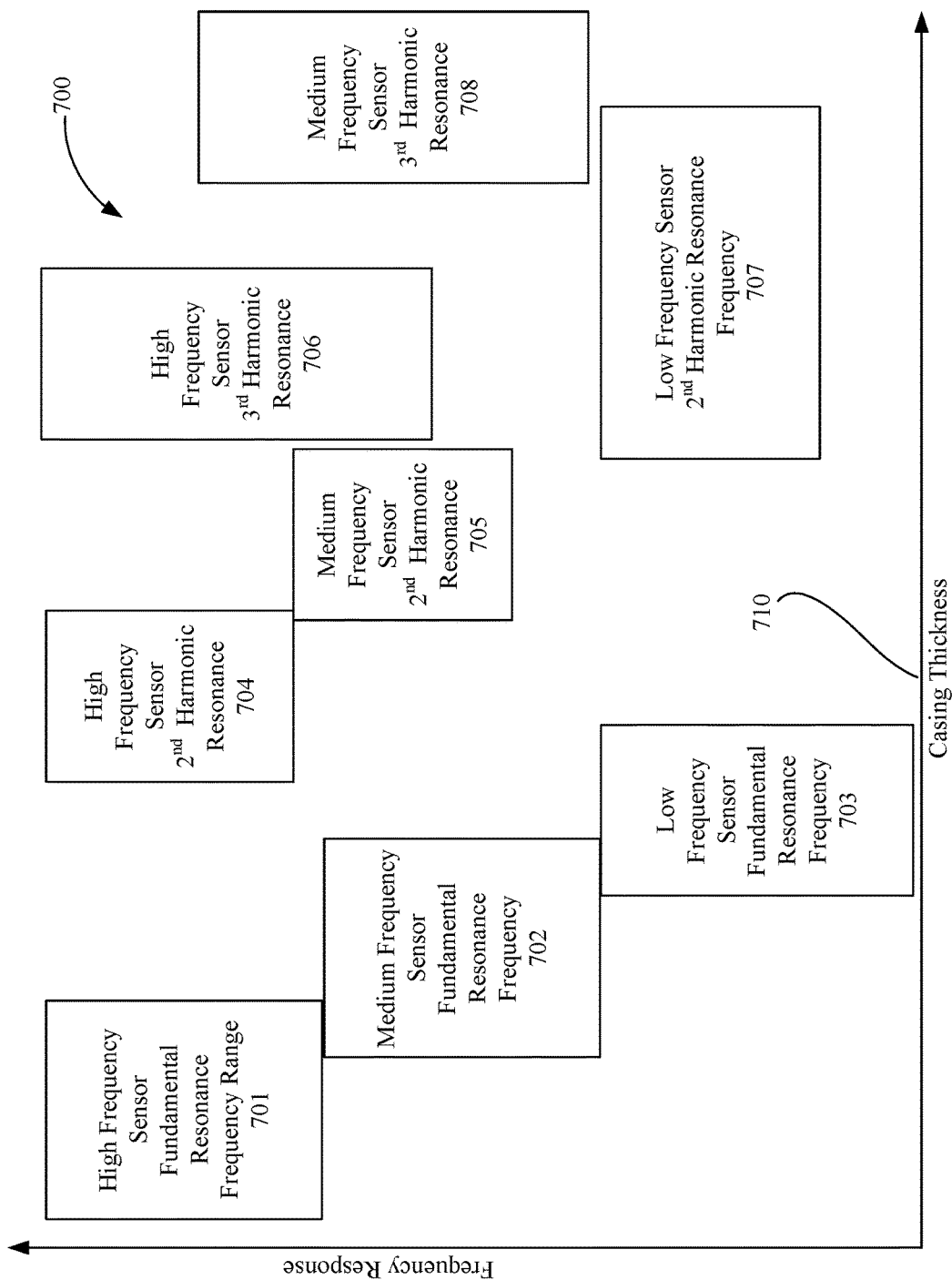
FIG. 7 shows a decision matrix for selecting acoustic sensors for logging a cased wellbore based on casing thickness.

FIG. 7 illustrates a decision matrix 700 for selecting acoustic sensors for CBL measurements on a cased borehole as a function of casing thickness. Casing thickness is shown on the horizontal axis and acoustic frequency response is shown on the perpendicular axis. As explained above, the resonance frequency of a casing is inversely proportional to its thickness. For the thinnest casings, a high frequency sensor 701 would be used to excite and/or detect the fundamental resonance frequency of the casing. For a thicker casing, a medium frequency sensor 702 would be used and for an even thicker casing, a low frequency sensor 703 would be used. For casings that are too thick to be accurately logged with a low frequency acoustic sensor, a higher frequency sensor 704 can be used to monitor the second harmonic of the resonance frequency. For thicker and thicker casings (and correspondingly lower and lower resonance frequencies), appropriate sensors 701-708 can be selected.

It should be noted that the particular matrix shown in FIG. 7 is illustrative only. The particular sensor selection may vary from tool to tool and form wellbore to wellbore. For example, the casing thickness at 710 on FIG. 7 is too great for the low frequency sensor 703 and the matrix indicates that one should use the high frequency sensor to monitor the second harmonic frequency. The progression through the sensors, as a function of casing thickness is High Frequency→Medium Frequency→Low Frequency→High Frequency (second harmonic), and so on. However, for some UWTs and conditions, using a medium frequency sensor to monitor the second harmonic frequency for a casing thickness corresponding to 710 might be more appropriate, and the progression of sensors as a function of casing thickness would be High Frequency→Medium Frequency→Low Frequency→Medium Frequency (second harmonic), and so on. The particular sensors to use for particular casing thicknesses is generally determined empirically on a tool-by-tool basis and can be calibrated according to particular conditions.

Figure 8:
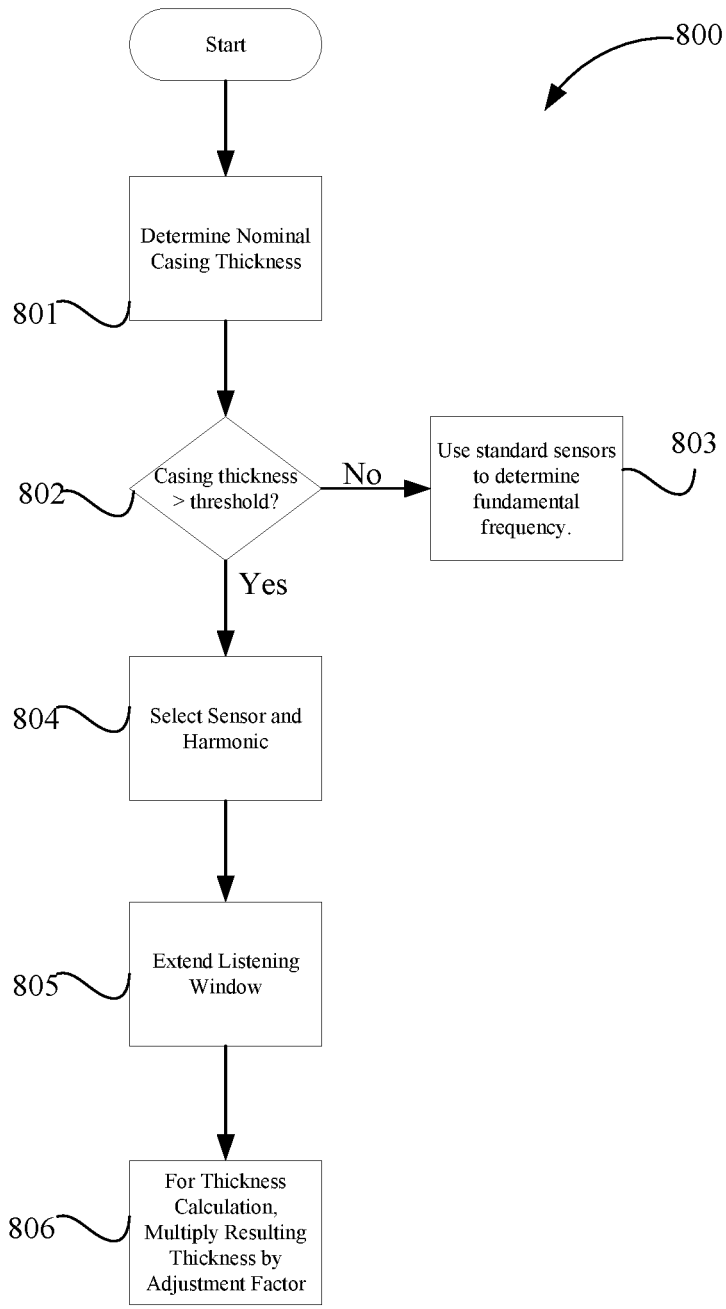
FIG. 8 shows a method of logging a wellbore having a cemented casing.

FIG. 8 is a flow chart 800 illustrating a method of using a UWT as described herein. A nominal casing thickness is determined at step 801. Typically, the nominal casing thickness is determined based on records of what was originally installed in the wellbore. If the nominal casing thickness is below a threshold such that the fundamental frequency can be measured using standard sensors, then the measurements are simply obtained per normal 803. The threshold casing thickness is typically determined empirically for each UWT/sensor combination.

If the casing thickness is greater than the threshold value, then an appropriate sensor is selected to measure an appropriate harmonic frequency (804), as illustrated in FIGS. 6 and 7. For example, a high frequency sensor may be chosen to detect the second harmonic of the resonance frequency. When detecting a second or higher harmonic frequency, the operator will typically extend the time window (805) over which ring down in amplitude of the casing reverberation is measured (e.g., window 403 of FIG. 4). Generally, the time window 403 is about 10 to about 30 seconds when measuring the ring down of a fundamental frequency. When measuring a second harmonic, an operator may extend the time window to about 20 to about 60 seconds.

To determine the actual casing thickness, the acoustically determined thickness must be multiplied by an adjustment factor 806 that is determined by the mode of the frequency that is measured. For example, if the second harmonic frequency is measured, the thickness determined using a standard calculation will be half the true value. The determined value must therefore be multiplied by two. In other words, the adjustment factor for measurements of the second harmonic is two; the adjustment factor for measurements of the third harmonic is three.

Table 1 shows the sensor types and harmonics used to measure casings of various thicknesses with an embodiment of an UWT according to the present disclosure.

TABLE 1

Acoustic UWT measurements of casings of different nominal thicknesses.

| Thickness (inches) | Sensor | Harmonic | Adjustment Factor |
|---|---|---|---|
| 0.60 | LOW | Fundamental | 1 |
| 0.65 | LOW | Fundamental | 1 |
| 0.70 | LOW | Fundamental | 1 |
| 0.75 | STD | Second | 2 |
| 0.80 | STD | Second | 2 |
| 0.85 | LOW | Second | 2 |
| 0.90 | LOW | Second | 2 |
| 0.95 | LOW | Second | 2 |
| 1.00 | LOW | Second | 2 |
| 1.10 | LOW | Second | 2 |
| 1.20 | LOW | Third | 3 |

As shown in Table 1, wellbores with casings having nominal thicknesses greater than 0.625 inches can be logged using the UWTs and methods described herein. According to some embodiments, wellbores with casings up to 2 inches thick can be logged.

While the invention herein disclosed has been described in terms of specific embodiments and applications thereof, numerous modifications and variations could be made thereto by those skilled in the art without departing from the scope of the invention set forth in the claims.

What is claimed is:

1. A method of logging a wellbore having a casing, the method comprising:
    determining a nominal wall thickness of the casing;
    selecting an acoustic transducer, wherein
        the selected acoustic transducer is tuned for measuring a casing having a wall thickness less than the nominal wall thickness, and wherein
        the nominal wall thickness of the casing is too great for the casing to be excited at a fundamental frequency of the casing by the selected acoustic transducer;
    selecting a harmonic of a resonance frequency of the casing based on the nominal wall thickness and the selected acoustic transducer;
    using the selected acoustic transducer to stimulate vibration of the casing at the selected harmonic;
    measuring an acoustic signal generated by the vibration of the casing; and
    calculating an actual wall thickness of the casing based on the acoustic signal by multiplying an acoustically determined casing thickness by an adjustment factor wherein the acoustically determined casing thickness corresponds to a thickness calculated as if the acoustic signal were at the fundamental resonant frequency and the adjustment factor corresponds to a mode of the harmonic.

2. The method of claim 1, wherein the nominal wall thickness of the casing is between 0.7 inches and 2 inches.

3. The method of claim 1, wherein the nominal wall thickness of the casing is greater than 1 inch.

4. The method of claim 1, wherein the selected harmonic is a second or third harmonic.

5. The method of claim 4, wherein the selected harmonic is a second harmonic and the adjustment factor is 2.

6. The method of claim 4, wherein the selected harmonic is a third harmonic and the adjustment factor is 3.

7. The method claim 1, further comprising: determining an attenuation of the acoustic signal, and determining a parameter relating to cement within the wellbore based on the attenuation.

8. The method of claim 7, wherein the parameter relating to cement within the wellbore comprises bond strength of the cement to the casing.

9. The method of claim 7, wherein the parameter relating to cement within the wellbore comprises compressive strength of the cement.

* * * * *